United States Patent [19]

Rist

[11] Patent Number: 4,741,093

[45] Date of Patent: May 3, 1988

[54] METHOD FOR INSERTING WINDINGS INTO STATOR SLOTS

[76] Inventor: Otto Rist, Schwanenstrasse 34, 7980 Ravensburg, Fed. Rep. of Germany

[21] Appl. No.: 645,302

[22] Filed: Aug. 29, 1984

Related U.S. Application Data

[63] Continuation of Ser. No. 811,562, Jun. 30, 1977, abandoned.

[30] Foreign Application Priority Data

Jul. 5, 1976 [DE] Fed. Rep. of Germany ....... 2630183

[51] Int. Cl.$^4$ ............................................. H02K 15/06
[52] U.S. Cl. ........................................ 29/596; 29/606
[58] Field of Search ................. 29/732, 734, 736, 596, 29/606

[56] References Cited

U.S. PATENT DOCUMENTS

| | | | |
|---|---|---|---|
| 2,432,267 | 12/1947 | Adamson | 29/155.5 |
| 3,324,536 | 6/1967 | Hill | 29/205 |
| 3,402,462 | 9/1968 | Walker et al. | 29/596 |
| 3,507,029 | 4/1970 | Stuckey et al. | 29/205 |
| 3,698,063 | 10/1972 | Smith | 29/205 R |
| 3,811,169 | 5/1977 | Werner | 29/736 |
| 3,815,206 | 6/1974 | Smith | 29/732 X |
| 3,815,207 | 6/1974 | Habegger | 29/205 R |
| 3,831,255 | 8/1974 | Smith et al. | 29/205 E |
| 3,831,641 | 8/1974 | Schlandroff et al. | 29/732 X |
| 3,885,288 | 5/1975 | Lund | 29/736 |
| 3,888,638 | 6/1975 | Walker | 29/734 |
| 3,949,464 | 4/1976 | Walker | 29/736 X |
| 4,024,632 | 5/1974 | Inglis | 29/736 |

FOREIGN PATENT DOCUMENTS

649432 1/1951 United Kingdom .
1391971 4/1975 United Kingdom .

Primary Examiner—Carl E. Hall
Attorney, Agent, or Firm—Fleit, Jacobson, Cohn & Price

[57] ABSTRACT

A method and apparatus for placing prewound windings into the grooves of stator coils and armatures in which needles are employed to insert the stator coils into the grooves. During insertion, the needles are displaced with a feeding movement in a longitudinal direction to the slots thereby obviating damage to the wires during their insertion. During insertion both the needles with the inserted coils and cover slide are enabled to move to promote the insertion procedure and without causing damage to the coils in the process of such insertion.

2 Claims, 6 Drawing Sheets

METHOD FOR INSERTING WINDINGS INTO STATOR SLOTS

This is a continuation of application Ser. No. 811,562 filed June 30, 1977 now abandoned.

BACKGROUND OF THE INVENTION

The present invention relates to a method for inserting windings into the grooves of stator coils and armatures in electric motors.

The invention further relates to an apparatus for carrying out such a method. The apparatus includes an insertion tool movable along the slots with the windings arranged on needles which are capable of insertion into the grooves.

Previously known methods and apparatus for inserting coils or windings into the grooves of stators or armatures of electric motors employed drawing needles which were disposed circularly on a die so that when a lifting movement of the insertion tool occurred, the windings located or carried by the needles were pressed into the corresponding stator or armature slots. The described method was complicated in that it was necessary to achieve a precise location of the needles and excessive frictional forces developed where there was a clamping relationship between the windings and the needles which frequently led to damaging of the windings and the draw-in needles and the protective lips thereof.

The problem was further complicated by the need for different length of coils, which necessitated individual adjustment of the needle length. As a consequence, there was time-consuming effort involved in the insertion process, and frequent damage to both the coil and the needle resulted. Also, because of the "pressing in" of the coils there were high cross-forces which developed between the needle and the windings, tending to cause damage or breakage in extreme cases.

SUMMARY OF THE INVENTION

The present invention has for its principal object the development of a method utilizing needles for placement of the coils into slots in a particularly unique manner to obviate damage to the windings or distortion to the windings as a result of excessive elongations during the insertion process.

Another object of the present invention is to provide an apparatus which can carry out the described method and in which the winding head need not be hand operated, but can be operated automatically and in conjunction with the drawing-in process. In other words, the winding head in which the coil is generated can be employed in conjunction with the present apparatus so that, upon completion of the winding, the drawing-in procedure can follow automatically and in series. Moreover, cover slides can easily be employed to cover the windings and are introducible without damage during the drawing-in or insertion of the coils into the slots.

An important feature of the present invention is that the described method uses a drawing-in tool having needles displaced in the direction of a feed movement which occurs in a longitudinal direction to the slots.

A significant feature of the method utilized in this invention is that the entire drawing-in tool which is utilized to place the coils into the slots is displaced for feed movement along the slots. There is no relative movement between the wire coils and the insertion needles, which could cause severe stressing of the coils as well as damage to the wire and the clamping zones as the needles advance along the slots. The spacing of this advancing movement is equal to the speed with which the coils and the cover slide are inserted into the slots of the stator or armature and hence there is no distortion which can occur to the coils.

The present invention does not press the windings along the needles as they reach the slot, but by simply raising the tool and needles as a combination, the coils and cover slides are directly emplaced into the corresponding slots. With previous methods, the needles are not moved during the insertion process and, hence, are distinctly different from the method followed in the present invention, which enables the needles together with the coils and cover slides to move in unison.

In accordance with the present invention, the insertion head with the insertion needles, includes a shaping portion of the needles axially movable in accordance with the direction of the windings as the windings are displaced into the slots of the armature or stator.

During insertion, the insertion head is rigidly connected to the shaping portion which effects displacement of the coils into the slot. The coils that are placed between the needles are pressed into the slots so that the insertion head which has a shaping portion with fingers firmly connected thereto, follows through in an advancing movement of the coils along the slots. In accordance with the present invention, therefore, there is no relative movement between the needles and the coils arranged therebetween since these members, including the cover needles, have a similar movement in the same direction along the slots of the stator and the armature. Because the needles are moved in the manner described, there is no damaging of the insulation on the coils or distortion because of mechanical displacement which could otherwise arise from a jamming or tearing of the coils. An edge protection of the plates is also obtained.

In a preferred embodiment of the method according to the present invention, a first step includes the coils being inserted in the needles of the insertion head of the tool; in a second step the stator bore and armature periphery are centered; and in a third step, an insertion tool including the needles is moved along the slots in order to insert the coils into the slots.

In another modification embodiment of the invention, the shaping part of the insertion tool presses the coils into the slot and is stopped in its forward movement just below the opposite front end edge of the stator sheet metal package and at the upper limit of the armature. This provides that the windings are inserted over the whole, or almost the whole, length of the slots.

The insertion head of the tool carries out an advancing movement in a counter direction up to the level of the front edge of the stator sheet metal package and as far as the insulation so that, in a further movement relative to the insertion head and the front edge of the stator sheet metal package, the insertion head continues in forward movement in order to form the stator sheet metal package. The insertion tool consists of a shaping part and an insertion head with needles which are prevented from forward movement while the lower loops of the coils are inserted sufficiently to form the winding head. The insertion head without the shaping part is then retracted, i.e., opposite to the advancing direction, so that the windings are relieved and mechanical stress is withdrawn by the described procedure.

In the following working example of the invention, the shaping part is moved in the forward direction relative to the insertion head so that such forming part passes out of the head and automatically forms the winding head above the front edge of the stator sheet metal package. The fingers which form the shaping part may be disposed in a longitudinal direction to the slot length so that the length of the package is twice the unshaped winding head length, keeps the coils in the slots in order to push in the cover slide. This is an improved method step compared with known methods. Previously it was not possible with conventional methods to use an insertion tool to form the winding head at the same time the winding head is advanced, without requiring movement on the opposite side.

The apparatus according to the present invention is characterized in that the length of the needles is shorter than the length of the slots in the stator sheet package.

A substantial saving in manufacturing cost for the insertion tool is achieved, since the insertion needles have a relatively short length and are capable of being manufactured inexpensively. The noses of the insertion needles are, according to the present invention, formed so that each of the needles on the side thereof facing the shaping part is surrounded by a protective edge of sheet metal plate which surrounds the needles on three sides thereof and includes flanks on both sides of the needles which are radial to the slot and engage with the noses of the needles. The only items need to be replaced upon wear are the edge protective sheet metal plates and the insertion needles.

In order to bring the cover shields within the coils, and the cover slides into the slots, there is provided in a further embodiment, a continuation end at the lower end of the fingers to provide a contact for the cover slide. In this manner, the cover slide can be inserted from below during the insertion of the coils into the stator slot. There are, therefore, no relative displacements required between the coils and the cover slide or between the needles and the fingers.

The fingers are thus provided with two preferred embodiments and are formed either as noses pointing outwardly or as a star.

With shorter stators or armatures, the cover slides can be correspondingly shorter with longer slots, so that a star can be utilized, if so desired. The star is integrally connected to the insertion head and the fingers to the shaping portion. At the same time, as lifting movement is given or imparted to the insertion tool and to the coils below, the cover slides are pushed substantially completely in an inward direction. The complete insertion of the cover slides is then effected at the same time as the shaping of the winding head.

Additionally, it is preferred to rotate the apparatus about an axis for locking in adjusted positions of rotation. Thus, the complete winding can be inserted at one time or in groups. The number of locking positions corresponds to the number of slots in each stator. Either before or after the insertion, the apparatus is rotatable around a pivot axis to the desired locking position and is then locked or indexed in this new position so that bobbins connected therewith can also be spooled in, free of control, directly and with any desired direction of rotation. There is provided the further advantage that groups of bobbins that are connected together can be spooled, free of control. Upon insertion it is advantageous to rotate the bobbin so that the bobbins can always be inserted in the front at a position on the periphery.

In addition, it is preferred to provide a ringed contact external of the cover slides; and the ring is preferably polished smoothly on its inner face and on the outer face. The relationship with the ring and slide is such that the cover slide cannot face outwardly.

The ring can be positioned in the individual rods of the cover slide in the correct position and is secured in that position by means of pins. Individual bobbins and wires slide over the closed ring and are thus not damaged. The workpiece is detachably carried on a pair of lateral and pivotal clamping jaws which are mounted and fixed on a single guide shaft.

BRIEF DESCRIPTION OF THE DRAWINGS

The invention will be further described with reference to the accompanying drawings.

DETAILED DESCRIPTION OF THE PREFERRED EMBODIMENTS

Figure 1:
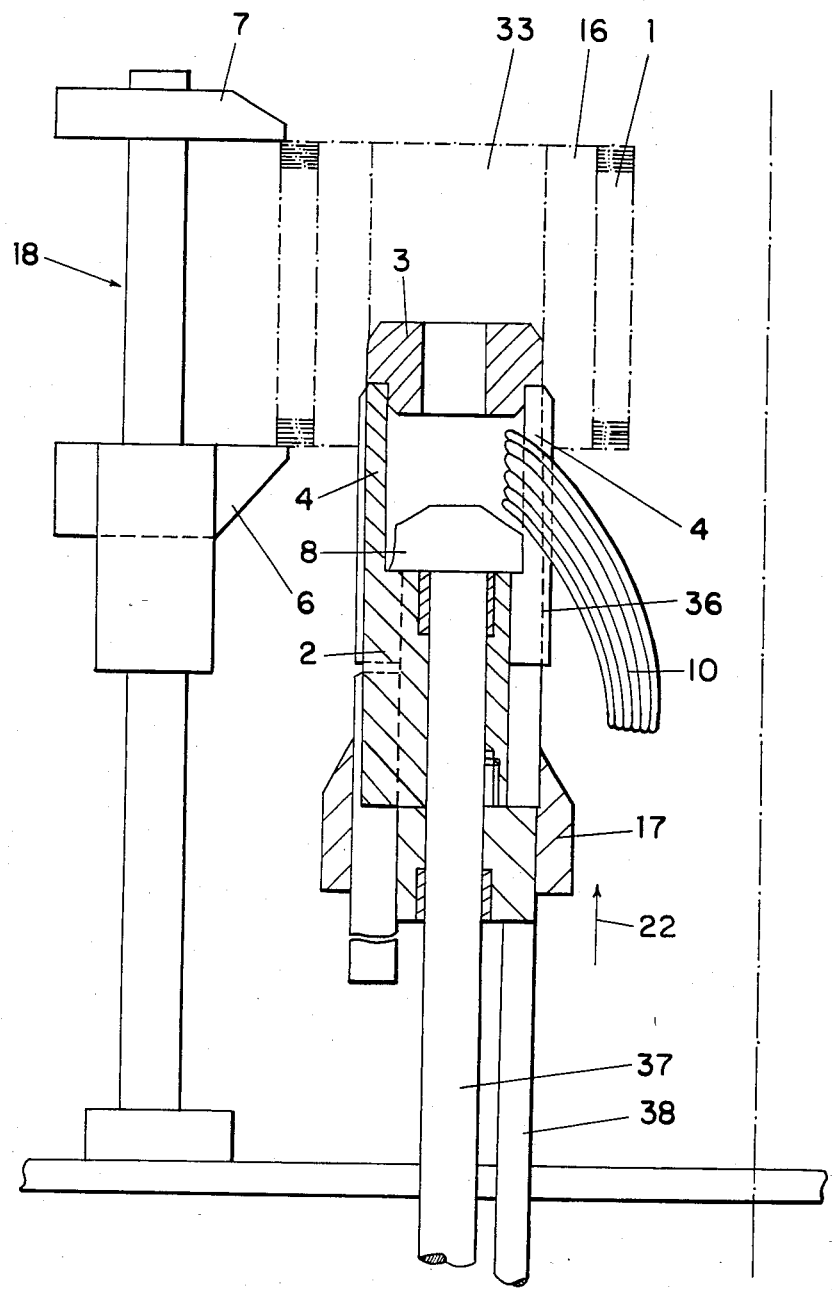
FIG. 1 shows in side view an insertion tool with the coils already placed in the insertion head and the needles centered on the stator.

Windings 10 are drawn into slots 16 of a stator sheet metal package 1 by an insertion tool consisting of an insertion head 2 having needles 4 and a slipping, or shaping, portion 8 which effects forward (or upward) movement in the direction of the arrow 22. A stator sheet metal package 1 is placed on an insertion head 2 and centered by means of clamping jaws 6, 7 on a holder 18. The windings 10 are inserted in slot 15 between the needles 4 of the insertion head 2. The metal package 1 is therefore in the initial position illustrated in FIG. 1.

The head 2 is connected to a holding rod 38 while the shaping portion 8 which is movable within the head 2 is fixed on a thrust rod 37. The thrust rod 37 and the holding rod 38 are positioned on a feed, and are not shown in detail but are adapted to advance or withdraw the mentioned parts individually or jointly in the direction of the arrow 22. As illustrated in FIG. 1, the insertion of the windings 10 into the slots 16 of the stator sheet metal package 1 occurs by a joint advancing movement of the insertion head 2 together with the needles 4, and then forming occurs by the forming or slipping portion 8 which operates in direction 22.

Figure 2:
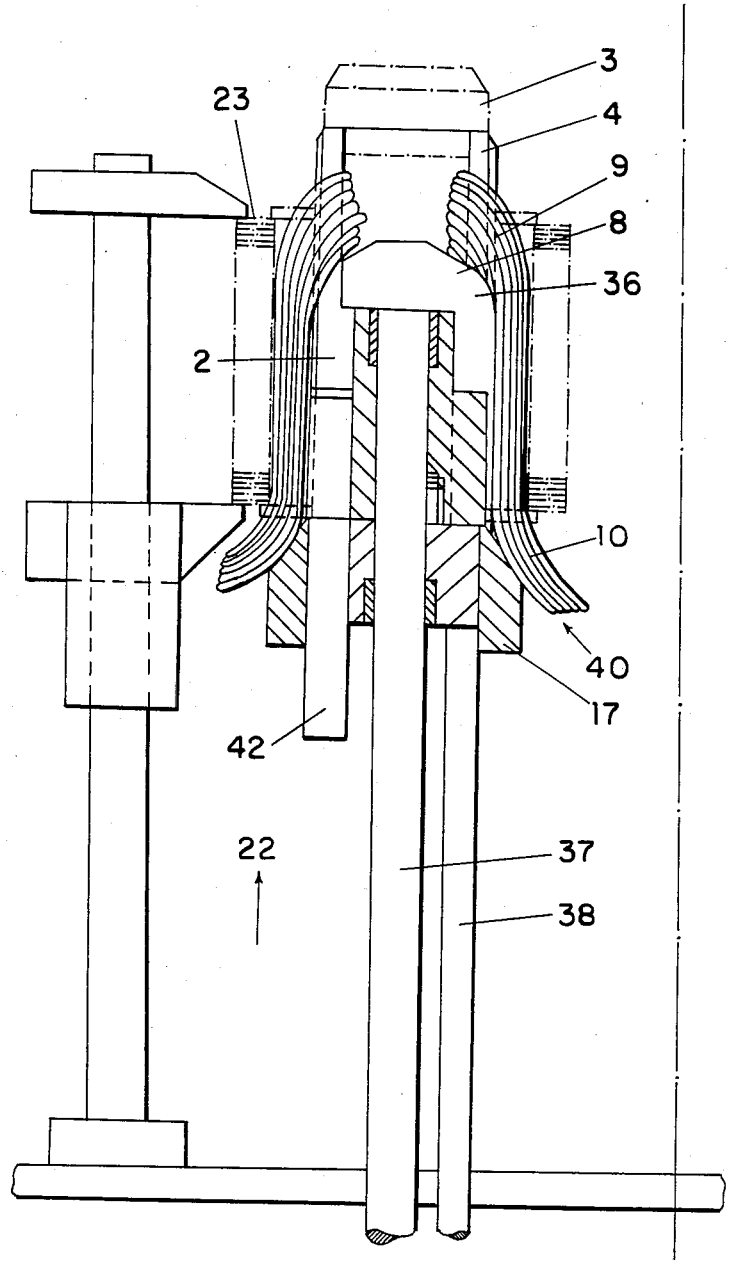
FIG. 2 illustrates the insertion head previously shown in FIG. 1 and in which the windings are drawn inwardly by raising the insertion head and with the needles displaced radially outwardly to be adjacent to the slots.

FIG. 2 shows how, due to this forward movement of the parts, the windings 10 are pressed into the slot 16 of the stator sheet metal package 1.

Figure 5:
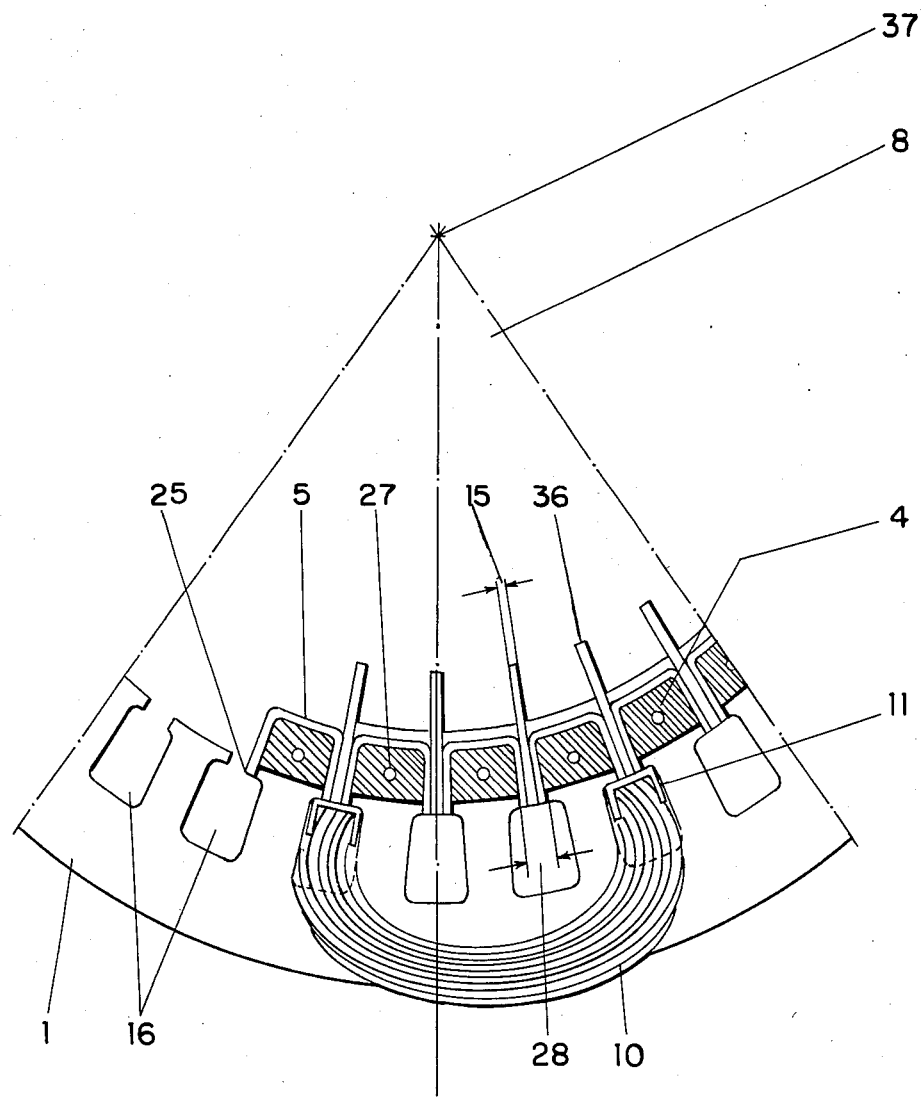
FIG. 5 illustrates in partial sectional view the insertion tool with the shaping part and needles in the position following insertion of a winding.

FIG. 5 illustrates in plan view the portions of the shaping member 8 which is connected to fingers 36 pointing outwardly in radial directions, with the fingers engaging between the slots 15 of the needles 4 and with noses 25 of the edge protective sheet metal plate 5 of the needles 4 projecting partly into the slot 16 so that forward movement of the insertion tool pressing the windings 10 into the slot 16.

The insertion head 2 has insertion needles 4 which are arranged circularly, one next to the other, and are surrounded by edge protective sheet metal plate 5 with rounded sides. In this way, needles are adequately protected and only the edge protective sheet metal plates need be changed from time to time and are, in fact, easily replaced. The edge protected sheet metal plates 5 surround the needles at three sides and project radially, forming bearing surfaces for the needles 4 so that the edge protective sheet metal plates 5 form "noses" 25 on their edges. The noses partially extend into the slot 16 of the stator sheet metal plate 1 to provide maximum protection for the needles 4.

Figure 3:
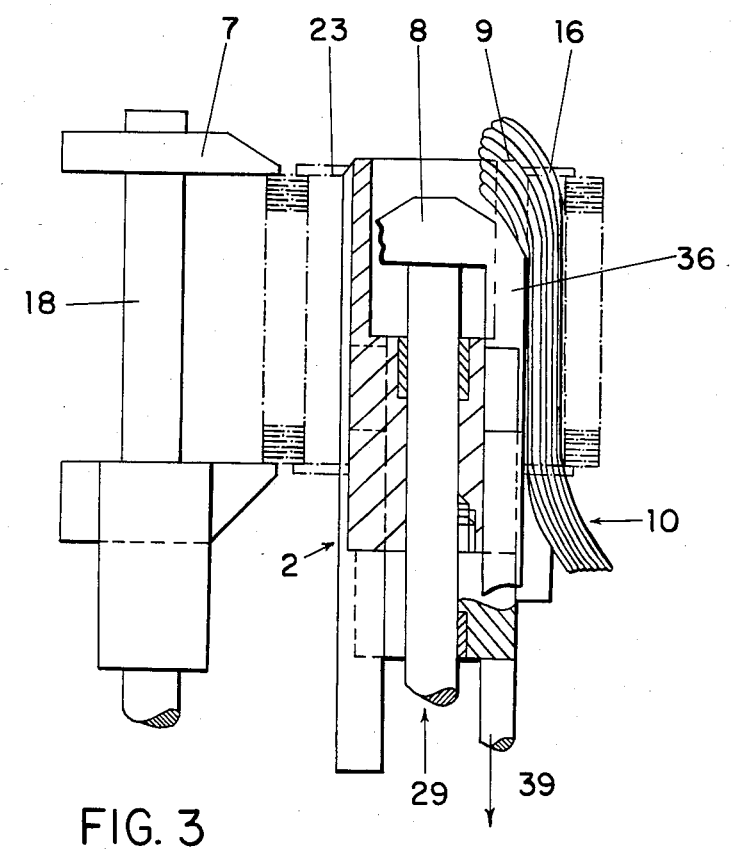
FIG. 3 illustrates the same tools as in FIGS. 1, 2, with the insertion head and insertion needles retracted back to the level of the front edges of the stator bore and with the shaping portion returned to its position within the stator bore.

In the representation illustrated in FIG. 2, the insertion head 2 with needles 4 together with the fixed insertion head 3 is displaced outwardly as far as a stop from the stator bore 33 (see FIGS. 1, 2). From the illustration of FIG. 2, it can be seen that on the lower part of the tool is a winding head fitting 17 arranged so that during the driving out of the tool moving in the direction of the arrows 22, the lower end of the winding head 10 windings are formed outwardly. In the next working procedure illustrated in FIG. 3, the head 2 with needles 4 is drawn backwardly in the direction of arrow 39 in opposition to the advancing movement 22 so that a portion 9 of the winding 10 and the shape assumed by a winding head 14, is mechanically relieved. During this backward movement of the head 2 the shaping part 8 is firmly held and remains in the same position as is illustrated in FIG. 2.

Figure 4:
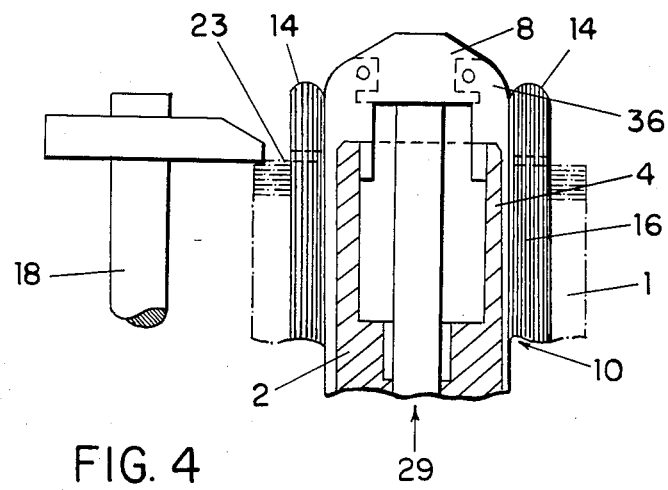
FIG. 4 illustrates the procedure in which the shaping part extends from the stator bore to form the winding.

In the embodiment illustrated in FIG. 4, the shaping part 8 is moved forwardly in the direction of the arrows 29 and undertakes a relative movement in respect to the head 2 and travels beyond the front edge 23 of the stator sheet metal plate 1.

Because of the driving out of the shaping part 8 in the direction of the arrows 29, the portion 9 of the winding 10 is pressed into the slot 16 and at the same time the winding head 14 is formed over the front edge 23 of the stator sheet metal plate.

Figure 6:
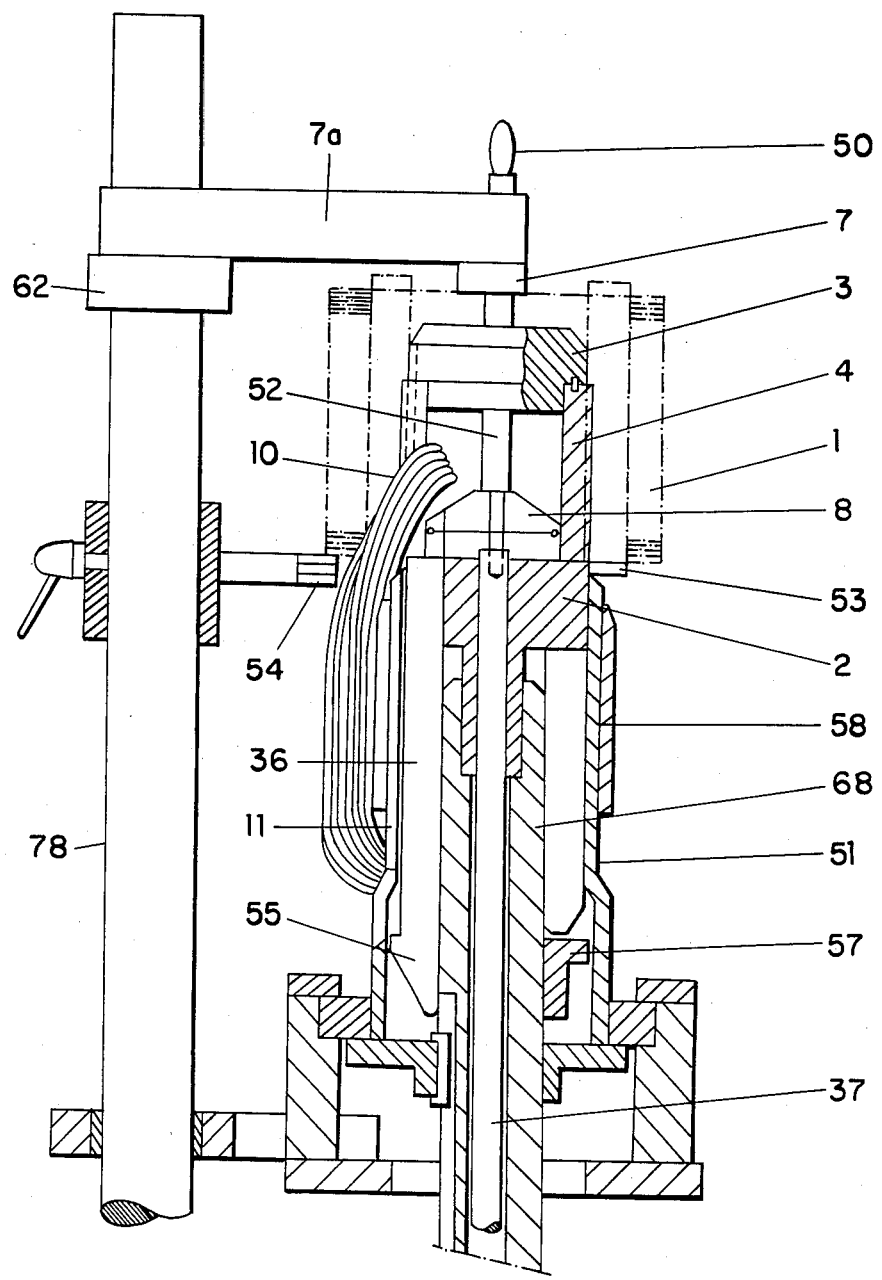
FIG. 6 illustrates one embodiment illustrating in partial side view the mode of operation with a simultaneous pushing in of the windings and the cover plates.
Figure 7:
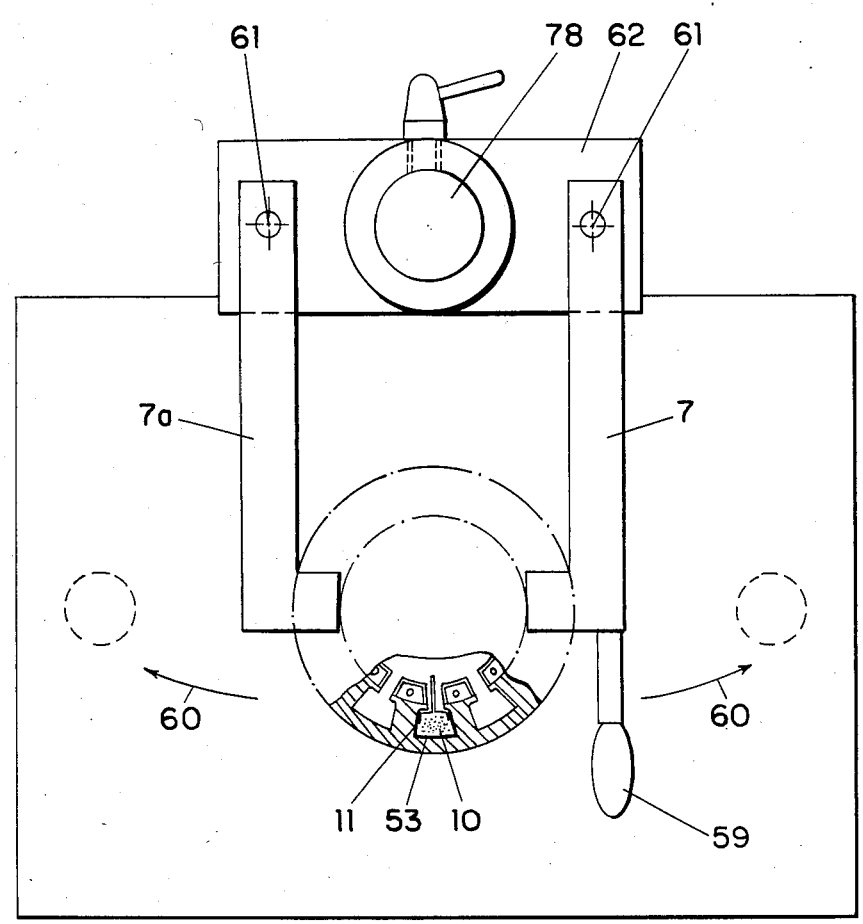
FIG. 7 is a plan view of the illustration of FIG. 6.

As shown in FIGS. 6, 7, at the same time that the winding 10 and a cover slide 11 enter the slots 16, the fingers 36 will, at the lower ends move upwardly and engage the slide 11.

OPERATION OF THE DEVICE

The insertion procedure of the windings 10 in the slot 16 have already been described. The windings 10 are spooled in by hand or by a transmission tool transfer; that is, the insertion needle 4. A centering and fixing piece is then placed thereover by means of a handle 50. The insertion procedure can now be carried out. The complete apparatus is moved as described with the head 2 including the needles 4 moving upwardly so that a cover slide magazine 51 and the stator 1 remain between the clamping jaws 7.

After the insertion procedure, the needles 4 are moved downward. By means of the intermediate piece 52 (FIG. 6) the centering and fixing head 3 is then lifted off so that the windings 16 are free. Smaller stator packages with the slot insulation 53 stand up directly on the cover slide magazine 51.

With large and heavy stator packages, it may be convenient to maintain these in the same position by one or more supports 54 so that the ends of the slot insulation 53 are not crushed by the upper edge of the cover slide magazine 51.

While lifting up the head 52 and during the insertion procedure, the cover slides 11 are pushed into the slot 16 by means of fingers 36, which are disposed radially inwardly of the nose 53. Note that the cover slides 11 are also sometimes referred to as "cover caps". If the shaping portion 8 drives out and forms the upper winding head 14, the cover slides 11 are brought into a correct position so that the slot 16, together with the insulating portion made up of cover slot 11 and slide insulation 53, are enclosed so that the winding lies inside this insulation.

The cover slide 11 may also be pressed in by a separate star 57 which is separate from the fingers 36 but which can contact the underside of the fingers 36 and is adjusted according to the length of the cover slide.

The problem of the insertion of the cover slides 11 from below, into the stator slot 16, is thus effectively solved. The cover slide magazine 51 can consist of a rotating part which is provided with slots. The number of the slots and the width of the slots depends upon the stator package 1 so that the cover slides cannot be displaced. A closed ring 58 can be fitted thereover and is polished on the outer portion and inner portion thereof to preclude damage to the windings. In addition to the ring 58, a number of pins are utilized so that individual rods of the cover slide magazine 51 are fixed in the correct operative position. The entire insertion head 2, together with the cover slide magazine 51, is rotatably mounted. This has the advantage that all of the windings can be inserted from the front. In this case a thrust rod 37 and bushing 68 rotate about their own axes.

The clamping jaws 7 (FIG. 7) are operated by means of a handle 59. At the same time, outer clamping jaws 7A are pivoted by means of a mechanical connection. The insertion procedure is effected automatically. If the insertion procedure has a wrong adjustment, the result is an overloading which occurs and a guide shaft 78 is then raised, and releases a stopping, of the insertion procedure. The guide shaft 76 carries a block 62 with the clamping jaws 7, 7A which are pivoted about the pivots 61.

With the embodiment illustrated in FIG. 5, the needle 4 forms a one-piece part with the body of the tool. This is a substantial advantage compared with known arrangements in which the needle is always detachably fixed on the tool body and the needles have to be machined on all sides. As illustrated in FIG. 5, the needles 4 have bores 27 which are provided for holding the fixing piece, or centering head, 3 and which are placed in the needles in the manner shown in FIGS. 1–3. In another embodiment, the fixing piece, or centering head, 3 is adapted to be substantially the same as the shaping portion 8 with fingers 16. Such a fixing and centering head 3 is then, according to the representation in FIG. 1, placed with its fingers between the slots 15 of the needles, thus keeping the slot 15 constant over the whole length of the slot 16, since the inner side of the needles contacts the centering and fixing head 3 in a radial direction, both secured radially inwardly against bending.

The tool according to the invention costs about 30% to 50% less than conventional insertion tools. This saving is primarily attributable to the relatively short length of needle 4. The needle 4 can be made relatively short because the method, according to this invention, provides for an insertion in which the entire insertion tool consists of a head 2 with needles 4 disposed thereon, and the shaping tool 8 operatively associated therewith has a unit carried outwardly for advancing movement along the slot 16 of the stator sheet metal plate 1.

What I claim is:

1. A method for inserting windings in slots of stator packages in electric motors by means of a draw-in tool that is movable along the stator slots and that has circularly disposed needles carried on an insertion head so that the windings arranged on the needles are inserted into the slots, the tool also having an inner shaping head movable separately from the insertion head, said method comprising:

(a) looping a winding on the insertion head to pass between pairs of adjacent needles;
   (b) attaching a centering head for the insertion head to outer ends of the needles by pin and hole connection means for centering the needles relative to the stator bore;
   (c) moving the centering head, shaping head, and insertion head with the winding in place on the needles together in a first direction into the stator bore at a first axial end of the stator to draw the winding into the stator slots;
   (d) continuing the movement of the draw-in tool until a forward end of the winding extends outwardly of the stator bore at an opposite, second axial end of the stator;
   (e) stopping the movement of the draw-in tool when the inner shaping head of the draw-in tool is adjacent the opposite end of the stator bore;
   (f) reversing the movement of the insertion head and needles to move in a second direction opposite from the first direction independently of the shaping head and inwardly of the stator bore, with the centering head being detached from the needles, until the outer ends of the needles are opposite the second end of the stator; and
   (g) moving the inner shaping head outwardly in said first direction toward and past the second end of the stator independently of the insertion head to bend a portion of the winding radially outwardly adjacent said second stator end.

2. A method according to claim 1, wherein said draw-in tool includes an annular winding head slidably positioned downwardly of the insertion head and spaced axially inwardly from the outer ends of the needles, said method including the step of:

(h) moving the winding head fitting in the first direction to outwardly bend the winding at the first end of the stator.

* * * * *